Sept. 9, 1958  T. L. HIBBARD  2,851,131
WHEEL STRUCTURE
Filed Feb. 15, 1954
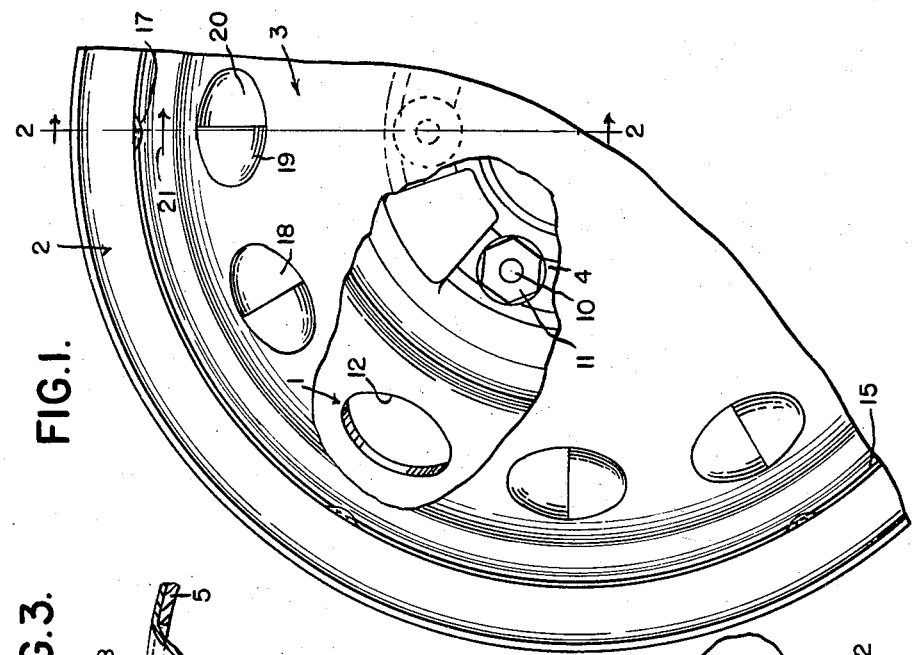
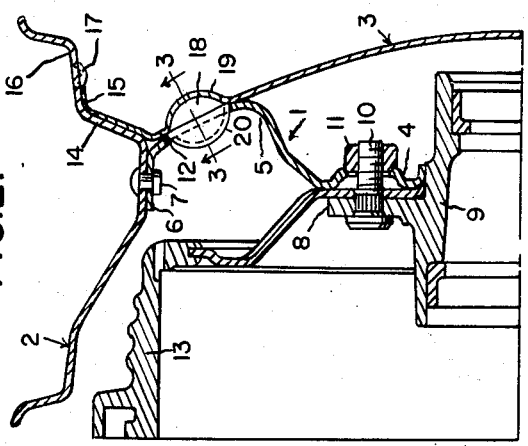
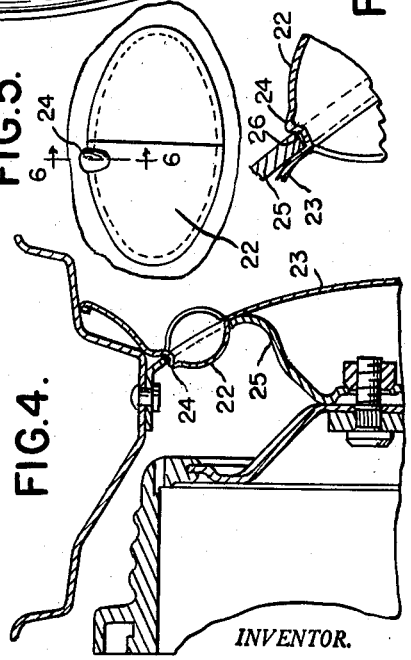
INVENTOR.
THOMAS L. HIBBARD
BY
ATTORNEYS

United States Patent Office 2,851,131
Patented Sept. 9, 1958

2,851,131

WHEEL STRUCTURE

Thomas L. Hibbard, Birmingham, Mich., assignor to Kelsey-Hayes Company, a corporation of Delaware Application February 15, 1954, Serial No. 410,178

11 Claims. (Cl. 188—264)

The invention relates to wheel structures and refers more particularly to motor vehicle wheel structures designed to ventilate brake structures associated with the wheel structures.

The invention has for one of its objects to provide an improved wheel structure comprising wheel body and rim parts, and a member at one side of the wheel body having means extending through an opening in the wheel body for effecting flow of air against a brake structure associated with the wheel structure.

The invention has for another object to provide a wheel structure in which the means for effecting flow of air also serves to secure the ventilating member to the wheel structure.

With these and other objects in view the invention resides in the novel features of construction and combination and arrangements of parts as more fully hereinafter set forth.

In the drawings:

Figure 1 is an outboard elevation partly broken away of a wheel structure embodying the invention;

Figure 2 is a cross-section on the line 2—2 of Figure 1;

Figure 3 is a cross-section on the line 3—3 of Figure 2;

Figure 4 is a view similar to Figure 2 showing a modified construction;

Figure 5 is an enlarged inboard elevation of a portion of Figure 4;

Figure 6 is a cross-section on the line 6—6 of Figure 5.

The wheel structure illustrated in Figures 1, 2 and 3 is a motor vehicle structure having the wheel body 1, the tire rim 2, and the circular cover 3. The wheel body is a wheel disk having the mounting or bolting-on portion 4, the web portion 5, and the peripheral flange 6 to which the tire rim 2 is secured by suitable means, such as the rivets 7. The mounting or bolting-on portion 4 is adapted to be detachably secured to the fixed radial flange 8 of the wheel hub 9 by suitable means, such as the bolts 10, and nuts 11. The web portion 5 has openings therethrough and in the present instance has the annular series of holes 12. 13 is the brake drum at the inboard side of the wheel disk and permanently secured to the fixed radial flange 8, preferably by the bolts 10. The cover 3 is located at the outboard side of the wheel structure and is a sheet metal disk extending over the wheel disk and the outboard side wall 14 of the well of the tire rim and terminating in the peripheral flange 15 fitting against the radially inner side of the outboard tire bead seat portion 16 of the tire rim. This peripheral flange has its edge located to engage the axially inner or inboard sides of the peripherally spaced humps 17, which extend radially inwardly from the outboard bead seat portion, to retain the cover. The cover is resilient so that it may be flexed while it is being attached to and detached from the tire rim.

To ventilate the brake drum 13, the cover 3 is provided with the openings 18, and the louvers 19 and 20 at its outboard and inboard sides respectively. These louvers are arranged in pairs and form a passage through the openings for air. The outboard louver 19 of each pair opens or faces peripherally in the direction of the arrow 21 in Figure 1 and picks up air and creates pressure in the air passage and the inboard louver 20 of each pair opens or faces peripherally in the opposite direction and creates vacuum or an ejection effect while the cover is rotating with the wheel structure in the direction shown by the arrow during the forward movement of the motor vehicle. The louvers are preferably formed by being stamped from the disk portion of the cover and are substantially semi-elliptical in elevation in the present instance. The louvers are positioned on the cover to register with the holes 12 of the wheel body and are of a size to provide for the inner louvers extending through the holes and beyond the inboard side of the portions of the web portion 5 encircling the holes.

As shown in Figures 4, 5 and 6, the wheel structure is generally the same as that of Figures 1, 2 and 3 with the exception that the inboard louvers 22 serve to secure the cover 23 to the wheel disk, the humps 17 being eliminated. More particularly, at least three of the inboard louvers 22 have their radially outer portions adjacent the free edges formed with the radially outwardly extending bosses 24 providing shoulders for engaging the inboard surface of the web portion 25 of the wheel disk radially outwardly of the holes 26. The cover is formed of sheet metal and is resilient to enable the inboard louvers 22 to be inserted through the holes 26 and the bosses 24 to snap into engagement with the web portion 25. Also, this resiliency enables prying off of the cover from the wheel disk.

What I claim is:

1. In a wheel structure, the combination with a wheel disk having an annular series of holes therethrough, of a cover member at one side of the wheel structure detachably secured thereto, having louvers at opposite sides of said cover member opening in opposite directions peripherally of said cover member, the louvers at one side of said cover member extending through the holes of said disk and beyond the side thereof opposite said cover member.

2. In a wheel structure, a wheel body having openings therethrough, and a member secured to one side of said wheel body having louvers at opposite sides of said member opening in opposite peripheral directions, the louvers at one side of said member extending through certain of the openings of said wheel body.

3. In a wheel structure, the combination with a wheel disk and tire rim parts, said wheel disk part having a web portion provided with holes therethrough, of a cover member at the outboard side of the wheel structure detachably secured to one of said parts, said cover member having louvers at its inboard and outboard sides opening in opposite peripheral directions and forming while the wheel structure is rotating a passage for air under the influence of the pressure of air picked up by louvers at the outboard side and the vacuum created by louvers at the inboard side, the louvers at the inboard side extending through the holes.

4. In a wheel structure, the combination with a wheel disk and tire rim parts, said wheel disk part having a web portion provided with holes therethrough, of a cover member at the outboard side of the wheel structure detachably secured to said tire rim part, said cover member having louvers at its inboard and outboard sides opening in opposite peripheral directions with the louvers at the inboard side extending through the holes and beyond the adjacent portions of said web portions.

5. In a wheel structure, the combination with a wheel disk and tire rim parts, said wheel disk part having a web portion provided with holes therethrough, of a cover member at the outboard side of the wheel structure detachably secured to said wheel disk part and having louvers at its inboard and outboard sides opening in opposite peripheral directions with the louvers at the inboard side extending through the holes.

6. In a wheel structure, the combination with a wheel disk having holes therethrough, of a cover member at the outboard side of said wheel disk having louvers at its inboard and outboard sides opening in opposite peripheral directions, certain of the louvers at the inboard side extending through associated holes and provided with means engageable with said wheel disk for detachably securing said cover member to said wheel disk.

7. In a wheel structure, the combination with a wheel disk having an annular series of holes therethrough, of a cover member at the outboard side of said wheel disk having louvers at its inboard and outboard sides opening in opposite peripheral directions, the louvers at the inboard side extending through the holes and beyond the adjacent portions of said wheel disk, and shoulder forming means on certain of said last mentioned louvers engaging said wheel disk for securing said cover member to said wheel disk.

8. In a wheel structure, the combination with a wheel disk having an annular series of holes therethrough, of a cover member at the outboard side of said wheel disk having louvers at its inboard and outboard sides opening in opposite peripheral directions, the louvers at the inboard side extending through the holes, and bosses on the radially outer portions of certain of said last mentioned louvers engaging said wheel disk and detachably securing said cover member to said wheel disk.

9. In a wheel structure, a wheel body having an annular series of holes therethrough, a cover member at the outboard side of the wheel structure and secured thereto, said cover member having an annular series of openings respectively registering with said holes, said cover member having a pair of louvers associated with each opening with the louvers of said pair respectively at the inboard and outboard sides of said cover member, the louvers of each pair opening toward each other in opposite directions peripherally of the wheel structure and creating a flow of air through the associated opening while the wheel structure is rotating by reason of one of said louvers picking up air to create pressure and the other louver creating a vacuum, the inboard louver of each pair extending through the registering hole in said wheel body.

10. In a wheel structure, a wheel body having an opening therethrough, and a member secured to the wheel structure at one side of said wheel body and having louvers at opposite sides of said member opening in opposite peripheral directions, the louver at the side of said member adjacent said wheel body extending through the opening in said wheel body.

11. In a wheel structure, the combination with a wheel body having an annular series of openings therethrough, of a cover member secured to the wheel structure at the outboard side of said wheel body, said cover member having louvers at its inboard side opening peripherally of the wheel structure and extending through associated openings, and means for detachably securing said cover member to said wheel body including bosses on certain of the said louvers providing shoulders engageable with the inboard surface of said wheel body adjacent the associated openings.

References Cited in the file of this patent

UNITED STATES PATENTS

| | | |
|---|---|---|
| 1,665,437 | Booth | Apr. 10, 1928 |
| 1,958,484 | Lyon | May 15, 1934 |
| 2,231,931 | Lyon | Feb. 18, 1941 |
| 2,312,159 | Gulotta | Feb. 23, 1943 |
| 2,754,942 | Lyon | July 17, 1956 |

FOREIGN PATENTS

| | | |
|---|---|---|
| 557,477 | Germany | Aug. 27, 1932 |